July 21, 1970
T. CARRIGAN
3,521,494
WHEEL CENTERING GUIDE
Filed Feb. 23, 1968
2 Sheets-Sheet 1
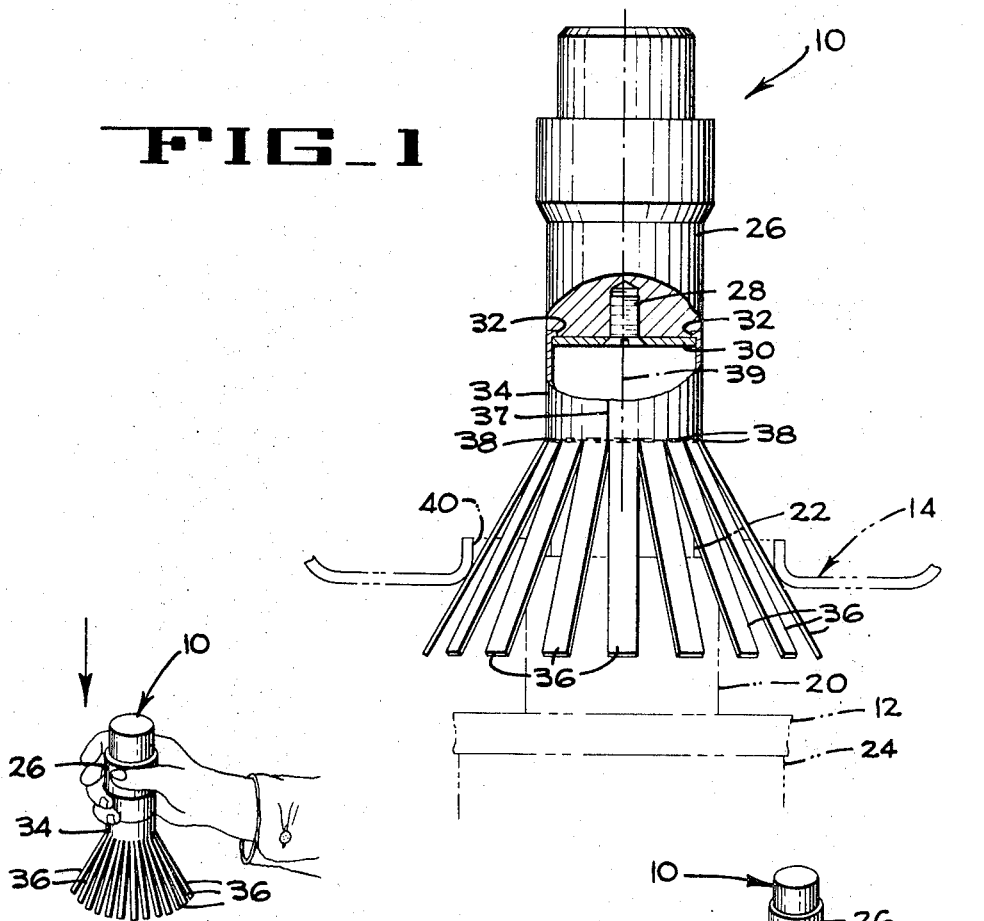
FIG_1
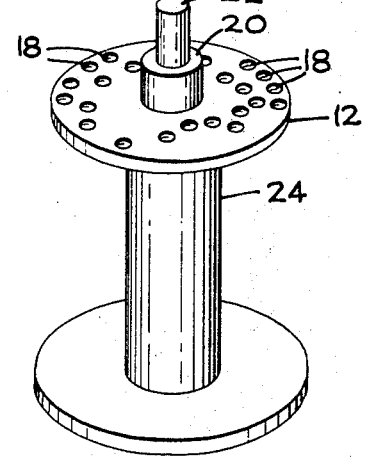
FIG_2
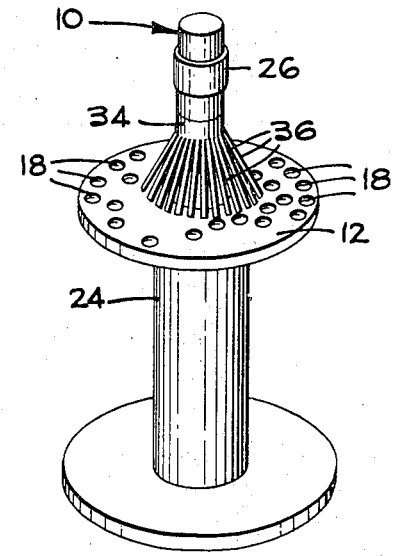
FIG_3
INVENTOR.
TRACY CARRIGAN
BY F. W. Anderson
C. E. Tripp
ATTORNEYS

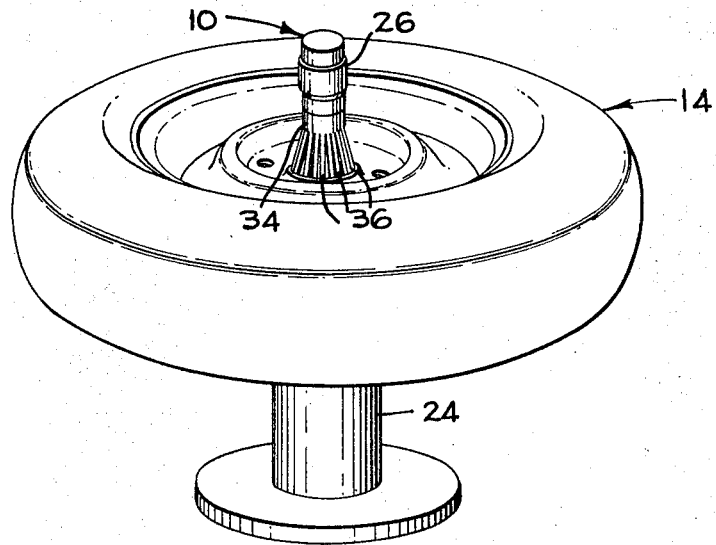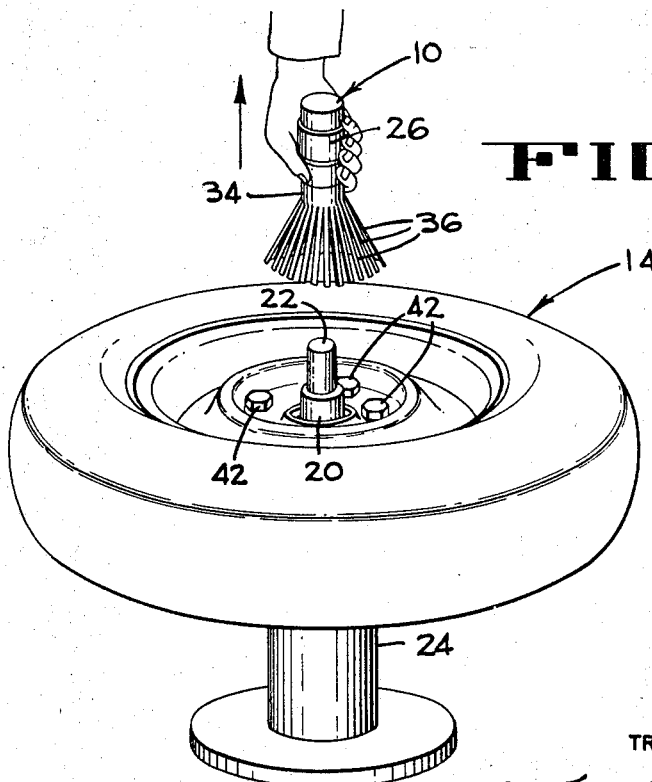

United States Patent Office 3,521,494
Patented July 21, 1970

3,521,494
WHEEL CENTERING GUIDE
Tracy Carrigan, Lansing, Mich., assignor to FMC Corporation, San Jose, Calif., a corporation of Delaware
Filed Feb. 23, 1968, Ser. No. 707,553
Int. Cl. G01m *1/04, 19/00*
U.S. Cl. 73—487       3 Claims

ABSTRACT OF THE DISCLOSURE

A cylindrical body is arranged to slide over the end portion of an axle which projects through an adapter disc having combinations of apertures matching the mounting apertures of different passenger vehicles. The body is provided with a circular array of resiliently flexible fingers that extend diagonally outward from the longitudinal axis of the body and toward the adapter disc. The fingers engage the edge of the central aperture in the wheel and flex uniformly, radially inward to guide the wheel into concentric relation with the adapter disc.

BACKGROUND OF THE INVENTION

The present invention concerns automotive wheel balancing apparatus, and more particularly concerns a dynamic wheel balancer that is employed with a dismounted wheel. One type of wheel balancer presently being used requires that the wheel be concentrically and firmly secured to a spindle of the balancer, preferably by means of bolts. The spindle is then rotated at relatively high speed so that dynamic imbalance of the wheel and tire assembly can be determined with force sensing mechanism associated with the spindle, and corrected by applying a weight or weights to the rim of the wheel.

Since different automobiles and light duty trucks use many different bolt patterns to secure the wheels to the hubs of the vehicles, the wheel balancer is provided with an adapter disc which will align with any bolt pattern and receive the spindle of the wheel balancer. Because the adapter disc must have a large number of apertures in order to match a variety of different bolt patterns, and because the central aperture of different wheels vary, it is difficult to visually align a wheel with the adapter disc. The wheel centering guide of the present invention concentrically aligns wheels having a wide range of different sized central apertures with the adapter disc, and maintains the concentricity while permitting the wheel and tire assembly to be rotated relative to the adapter disc until the desired bolt pattern apertures in the disc are aligned with the mounting apertures of the wheel. Following this alignment operation, the wheel is bolted to the adapter disc and the whole is transferred onto the spindle of the wheel balancer.

SUMMARY OF THE INVENTION

A hollow body slidably receives an axle that removably mounts an adapter disc concentric with the axle. Extending diagonally toward the adapter disc from the body is a circular array of linear, resiliently flexible fingers which cooperatively form a generally conical guide surface. Each finger is capable of resisting inward deflection with the same force as the other fingers. Therefore, the edge surface in contact with the fingers and defining the central aperture of a wheel is guided into and maintained in concentric relation with the adapter disc.

BRIEF DESCRIPTION OF THE DRAWINGS

FIG. 1 is a side elevation, partly broken away, of the wheel centering guide in association with a partially shown adapter disc and axle in phantom lines.

FIGS. 2-5 are perspectives showing sequential stages respectively illustrating installation of the wheel centering guide on an adapter disc, the guide installed in position to receve a wheel and tire assembly, a wheel guided onto the adapter disc by the guide, and the removal of the wheel centering guide after the wheel is bolted to the adapter disc.

DESCRIPTION OF THE PREFERRED EMBODIMENT

The wheel centering guide 10 (FIG. 1) of the present invention is useful in different environments, one of which employs an adapter disc 12 that adapts a vehicle wheel for mounting on a wheel balancing machine. By means of the centering guide 10, a wheel and tire assembly 14 is guided into concentric relation with the adapter disc 12. The wheel and adapter disc are then bolted together and mounted on the drive spindle of a dynamic wheel balancing machine, not shown, to determine the dynamic imbalance, if any, and to correct the imbalance by applying weights to the rim of the wheel.

A plurality of threaded apertures 18 in the adapter disc 12 are arranged in groups defining different bolt patterns, on a variety of radii, which correspond to the bolt patterns of various wheels. While it is possible to visually align the mounting apertures of a wheel with the appropriate apertures of the adapter disc by simultaneously rotating the wheel and tire assembly and keeping it as near concentric with the adapter disc as possible, this is a difficult task. By employing the wheel centering guide 10, concentricity is automatically attained and preserved while the operator rotates the wheel until the mounting holes in the wheel align with the proper pattern of mounting holes in the adapter disc.

The adapter disc 12 is provided with a central hub 20 having a bore which is arranged to slidably receive an axle 22. The axle is fixed in a floor-supported pedestal, or base member, that includes a column 24 which supports the adapter disc 12 in a position in which the upper end portion of the axle 22 projects through the hub 20. Thus supported, the adapter disc 12 is located by the complementary conformations defined by the bore of hub 20 and axle 22 so that each of the bolt hole patterns of threaded apertures 18 are precisely concentric with the longitudinal axis of the axle 22. Frictional engagement of the adapter disc 12 with the column 24 inhibits rotation of the adapter disc.

The wheel centering guide 10 includes a handle 26 having a threaded axial aperture. A flat head machine screw 28 is threaded into the aperture to secure a washer 30 against the end surface of a reduced-diameter end portion of the handle. In this manner, a circumferential groove is formed by the washer 30 and the adjacent exterior surfaces of the handle to grip an inwardly directed flange 32 of a hollow cylindrical body 34.

The body 34 is formed of an initially flat plate of annealed spring steel severed along parallel lines through part of its length to form a plurality of separate fingers 36. The plate is then rolled into a cylinder so that its side edges abut at 37 (FIG. 1). The flange 32 is then formed and the base portion of each finger at 38 is bent so that all of the fingers depend at a uniform angle to the longitudinal axis 39 of the body 34 and cooperatively define a generally conical guide surface. After forming, the plate is heat treated to restore its resilience.

When the wheel centering guide 10 is installed on the axle 22 (FIGS. 1-3), the washer 30 lies on the upper end of the axle 22 and the lower ends of the fingers 36 are spaced from the adapter plate 12, the axle 22 and the body 34 defining complementary locating members. The wheel and tire assembly 14 is then moved down over the wheel centering guide 10 until it is supported by the adapter disc 12. During this placement of the wheel, the wall 40 (FIG. 1) that defines the central aperture of the wheel initially contacts some or all of the flexible fingers 36, depending upon the alignment of the wheel relative to the axis 39.

The wheel will normally be to some degree misaligned, whereby those fingers which are contacted by the wall 40 are flexed inward and thus displace the wheel in a direction correcting such misalignment and causing the wheel to contact additional fingers. By the time the wheel is fully seated on the adapter disc 12, the combined outward forces caused by inward flexure of the resilient fingers 36 have not only guided the wheel into concentric alignment with the adapter disc, but will maintain such alignment while the wheel is rotated until its bolt holes are indexed with a like pattern of apertures 18 in the adapter disc 12. Although the wheel centering guide 10 will rotate with the wheel due to the frictional engagement of the fingers 36 with the wall 40, the alignment of the wheel with the adapter disc is not affected because the centering guide is symmetrical about the axis 39 and the body 34 is in circumferential engagement with the axle 22.

When the bolt holes are indexed (FIG. 4), the next step is to insert bolts 42 (FIG. 5) through the bolt holes in the wheel and thread the bolts into the threaded apertures of the adapter disc. Following this step, the handle 26 of the wheel centering guide 10 is grasped and pulled upwardly free of the tire and wheel assembly 14, thus freeing the wheel for removal from the pedestal and placement on a wheel balancing machine.

From the preceding disclosure, it will be seen that the wheel centering guide 10 provides a simple yet effective means of radially positioning a vehicle wheel concentrically on an axle having a diameter smaller than the diameter of the central aperture of the wheel.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for mounting a wheel on test apparatus, said wheel having a set of mounting holes, the combination comprising: an adapter disc member for said test apparatus having an axis therethrough and having a set of mounting holes spaced around said axis, said mounting holes matching the mounting holes on the wheel, a base member adapted to receive said disc member, a guide member removably mounted over said disc member and having a plurality of flexible members extending toward the disc member in a conical pattern, said guide member and one of said other members having means in cooperating relationship for locating the conical pattern in centered relationship with said axis through the disc.

2. Apparatus for mounting a wheel on test apparatus, said wheel having a set of mounting holes, the combination comprising: an adapter disc member for said test apparatus having a set of mounting holes matching the mounting holes on the wheel and having an axis normal to the disc face, said axis centered with respect to said set of mounuting holes on the disc, a base member adapted to receive said disc member, the base and the disc member having means in cooperating relationship to locate the disc axis with respect to the base, a guide member removably mounted over said disc member and having a plurality of flexible fingers extending toward the disc face in a conical pattern, said base member and said guide member having complementary members to center said conical pattern with respect to said disc axis, said guide member mounted with the flexible fingers thereof centered with respect to said axis to guide a wheel placed thereover onto the disc in centered relation with said axis.

3. Apparatus for mounting a wheel on test apparatus, said wheel having a central aperture and having a set of mounting holes angularly spaced around said aperture in a pattern concentric with said aperture, the combination comprising: an adapter disc member for said test apparatus having a plurality of sets of mounting holes, said sets having holes arrayed around a central axis through the disc, one of said sets matching the mounting holes on the wheel, a vertical base member, the base member and the disc member having means in cooperating relationship to support the disc member in predetermined relationship to the base member with the face of the disc member horizontal for receipt of a wheel, a guide member received over said disc member, said guide member having a plurality of flexible fingers extending outwardly in a conical pattern extending toward the disc member, said guide member and one of said other members having means engaged in cooperating relationship for locating the conical pattern of the guide fingers in centered relationship with the axis through the disc.

References Cited
UNITED STATES PATENTS

| | | | |
|---|---|---|---|
| 478,024 | 6/1892 | Rose | 29—272 |
| 1,822,649 | 9/1931 | Evans | 29—271 |
| 2,461,591 | 2/1949 | Currier | 73—484 |
| 3,122,021 | 2/1964 | Karig | 73—485 |

JAMES J. GILL, Primary Examiner

H. GOLDSTEIN, Assistant Examiner

U.S. Cl. X.R.

29—271; 144—288